Figure 1:
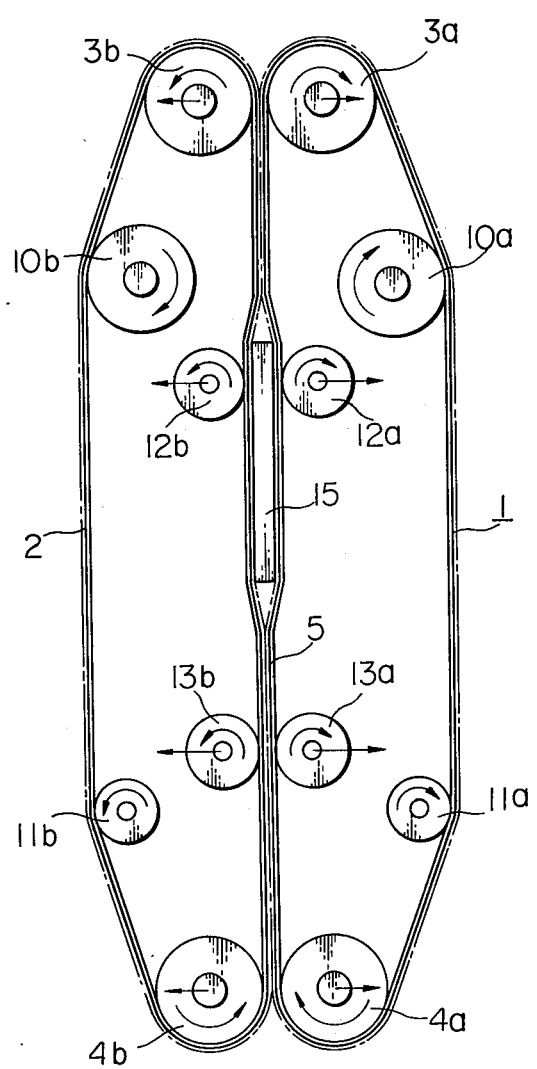

United States Patent [19]
Uraya

[11] 3,882,995
[45] May 13, 1975

[54] BELT CONVEYER

[75] Inventor: Toru Uraya, Kobe, Japan

[73] Assignee: Kanebo Ltd., Japan

[22] Filed: Mar. 15, 1973

[21] Appl. No.: 341,751

[30] Foreign Application Priority Data
Mar. 17, 1972  Japan.......................... 47-32775[U]

[52] U.S. Cl................................ 198/165; 198/193
[51] Int. Cl............................................ B65g 15/14
[58] Field of Search.................... 198/165, 162, 193

[56] References Cited
UNITED STATES PATENTS

| 779,980 | 1/1905 | Whitaker | 198/165 |
|---|---|---|---|
| 2,014,447 | 9/1935 | Needham | 198/165 |
| 2,493,837 | 1/1950 | Smith | 198/165 |
| 2,566,021 | 8/1951 | Fergnani | 198/165 |
| 2,841,270 | 7/1958 | Bombard | 198/165 |
| 3,139,810 | 7/1964 | Tobin, Jr. | 198/165 |
| 3,446,332 | 5/1969 | Bechtloff | 198/165 |
| 3,658,170 | 4/1972 | Wilson | 198/131 |

Primary Examiner—Evon C. Blunk
Assistant Examiner—Richard K. Thomson
Attorney, Agent, or Firm—Robert E. Burns; Emmanuel J. Lobato; Bruce L. Adams

[57] ABSTRACT

An improved belt conveyer comprising a pair of endless belts partly contacting each other so as to form a conveying passage. One conveyer belt has one surface entirely covered with male elements of a velvet type fastener while the other belt has one surface entirely covered with female elements of the fastener. The male elements of the belt engage with the female elements of the other belt at the conveying passage. In this passage, the endless belts are guided by guide rollers in interlocked condition capable of displacing away from each other whenever an article is conveyed by them.

15 Claims, 8 Drawing Figures

BELT CONVEYER

SUMMARY OF THE INVENTION

The present invention relates to a belt conveyer, more particularly relates to an improved belt conveyer for conveying substances in a particular condition so that the relative positions of conveying substances are positively maintained in supplied condition while being conveyed along the conveying passage.

In the conventional belt conveyer provided with a plurality of buckets secured to an endless belt or endless chain, the relative positions of conveyed substances are maintained in their supplied condition because of the relative disposition of the buckets on the endless belt or chain. However, the relative position of the substances in the conveying passage can not be changed because of the buckets disposition.

It is the principal object of the present invention that the conveying substances are carried along the conveying passage in a particular condition so that the relative position of two adjacent conveyed substances is positively maintained in supplied condition which is variable.

To attain this purpose, a pair of endless belts are provided. One of the endless belts is covered with a sheet of male elements of a velvet type fastener while another endless belt is covered with a sheet of female elements of a velvet type fastener. The said pair of belts are utilized so as to form a conveying passage where the male elements of one belt engage the female elements of the other belt. To permit passing a conveyed substance through a positively contacting position between the endless belts where a pair of guide rollers urge each other by way of the conveyer belts, at least one of these guide rollers is capable of displacing away from the other guide roller. In the belt conveyer according to the present invention, at least one vertical conveying passage is formed between the endless belts.

As mentioned above, the belt conveyer according to the present invention provides a large amount of freedom for positive transfer of substances by maintaining the relative position of the conveyed substances.

Further objects and characteristic features of the improved belt conveyer according to the present invention will be hereinafter illustrated in more detail with reference to the accompanying drawings.

BRIEF ILLUSTRATION OF THE DRAWINGS

Figure 2:
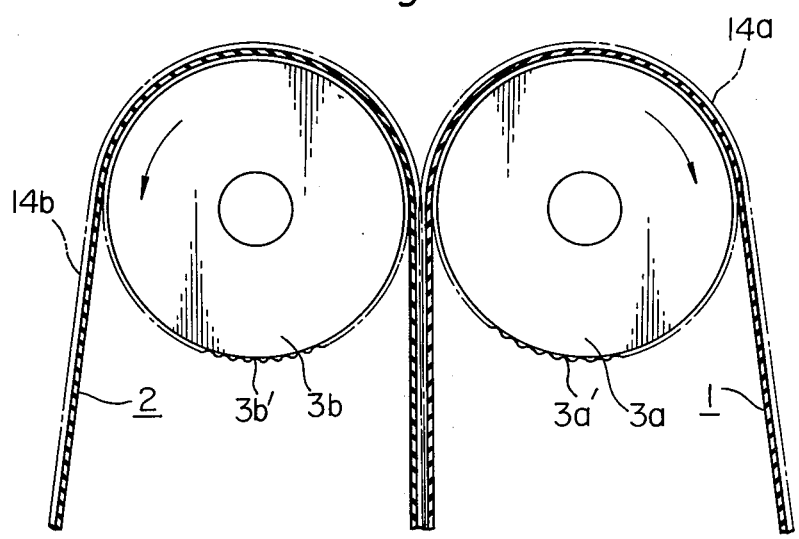
Figure 3:
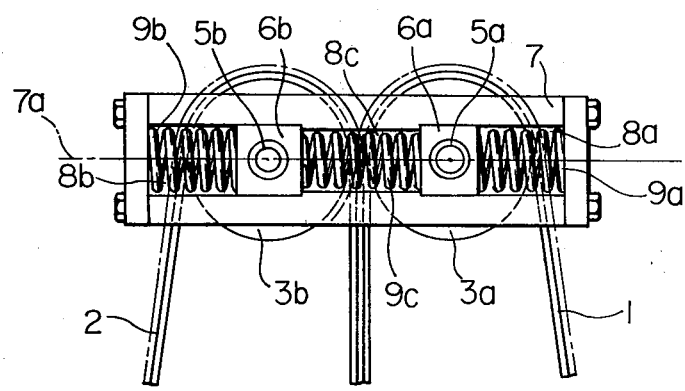
Figure 4:
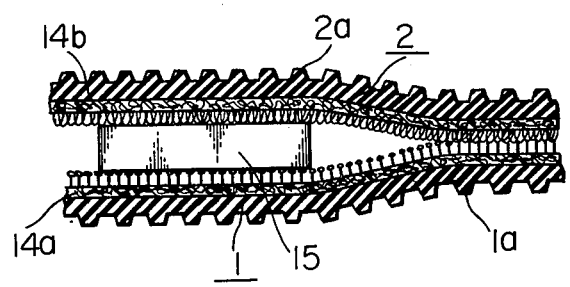
Figure 5:
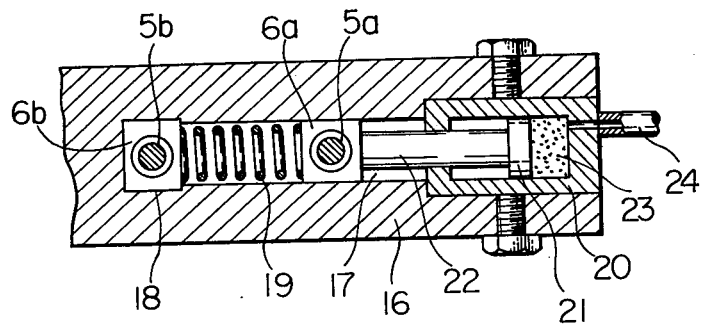
Figure 6:
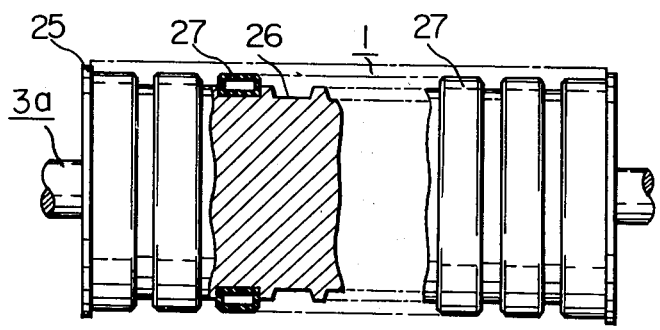
Figure 8:
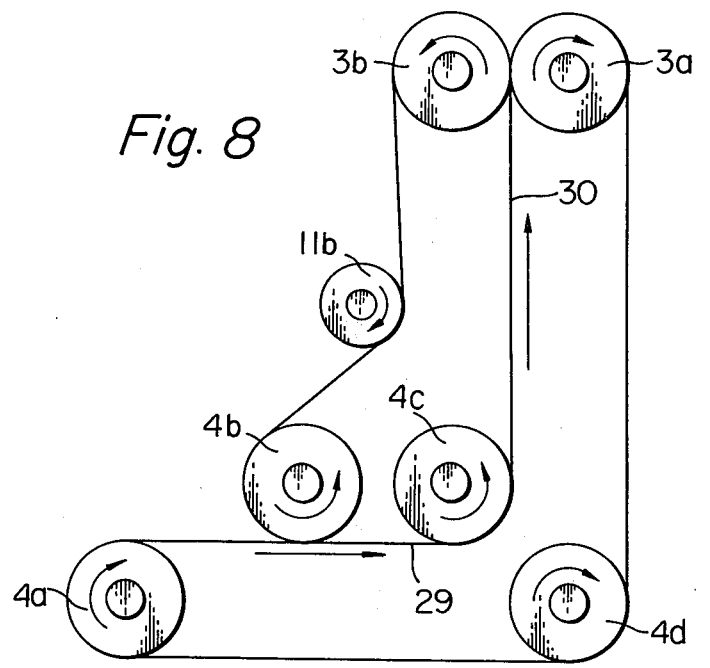
Figure 7:
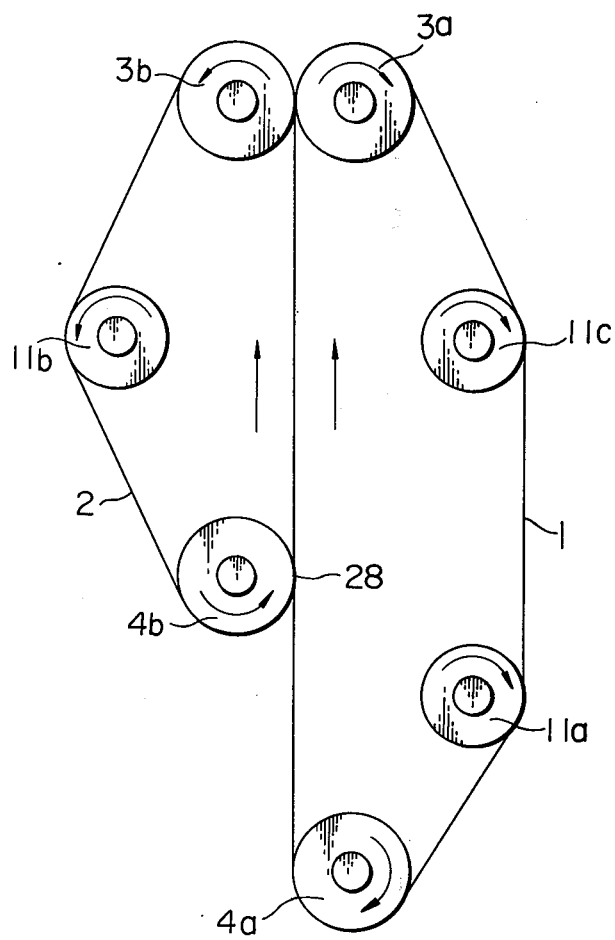

FIG. 1 is a schematic side view of an embodiment of belt conveyer according to the present invention, FIG. 2 is an enlarged schematic side view of a guide portion of the belt conveyer shown in FIG. 1, FIG. 3 is a schematic side view of a bearing support utilized for the embodiment shown in FIG. 1, FIG. 4 is an enlarged sectional view of a part of the belt conveyer shown in FIG. 1, FIG. 5 is a schematic sectional view of a modified bearing support utilized for the belt conveyer according to the present invention, FIG. 6 is a side view, partly in section of a modified guide roller utilized for the belt conveyer according to the present invention, FIG. 7 is a schematic side view of a modified belt conveyer according to the present invention, FIG. 8 is a schematic side view of another modified belt conveyer according to the present invention.

DETAILED ILLUSTRATION OF THE INVENTION

Referring to FIGS. 1, 2, 3, and 4 a belt conveyer according to the present invention is comprised of a pair of endless conveyer belts 1, 2, two pairs of guide rollers $3a$, $3b$ and $4a$, $4b$, by which an upright passage, shown as a vertical conveying passage 5 is formed. The pairs of guide rollers $3a$, $3b$ and $4a$, $4b$ are always urged toward each other by spring forces created by the respective springs mounted on a pair of bearing supports shown in FIG. 3. As shown in FIG. 3, the bearing support 7 is provided with horizontal guide slots $8a$, $8b$ and $8c$, provided with a common horizontal center line $7a$. The lateral width, of the slot $8c$, in perpendicular direction to the common horizontal center line $7a$ is narrower than those of the slots $8a$ and $8b$. A bearing $6a$ rotatably supporting a shaft $5a$ of the guide roller $3a$ is slidably mounted in the slot $8a$ while a bearing $6b$, rotatably supporting a shaft $5b$ of the guide roller $3b$, is also slidably mounted in the slot $8b$. A pair of helical springs $9a$ and $9b$, having identical resilient force, are inserted in the respective slots $8a$ and $8b$ in compressed condition, while an auxiliary helical spring $9c$ is inserted into the space $8c$ in compressed condition. The resilient force of the helical springs $9a$, $9b$ is much stronger than that of the helical spring $9c$, so that the guide rollers $3a$ and $3b$ positively urge the endless conveyer belts 1 and 2 toward each other. However, if a certain conveyed substance is subjected to passing through the contacting portion of the endless conveyer belts 1 and 2, the guide rollers $3a$ and $3b$ permit the passing of the conveyed substance through the above-mentioned contacting portion of the endless conveyer belts 1 and 2, because these rollers $3a$, $3b$ are capable of displacing along the respective horizontal slots $8a$, $8b$ so as to move away from each other. However, during the above-mentioned movement of the guide rollers $3a$, $3b$, these rollers $3a$, $3b$ are still urged toward each other by the resilient force created by the respective springs $9a$ and $9b$.

Each endless conveyer belt 1 or 2 is positively driven by a driving roller $10a$ or $10b$, connected to a driving mechanism (not shown). A tension roller $11a$ or $11b$ is utilized for imparting tension to the conveyer belt 1 or 2. Two pairs of control guide rollers $12a$, $12b$ and $13a$, $13b$ are mounted to the respective bearing supports (not shown) in such a manner that each pair of control guide rollers $12a$, $12b$ or $13a$, $13b$ positively sandwich the conveyer belts 1 and 2 at their vertical conveying passage. The construction and function of the above-mentioned bearing support (not shown) is identical to that for the guide rollers $3a$, $3b$ or $4a$, $4b$. Consequently, when a certain conveyed substance passes through a contacting portion of the belts 1 and 2, these rollers $12a$, $12b$ or $13a$, $13b$ are capable of displacing away from each other so that the conveyed substance is permitted to pass this contacting portion.

In the present invention, it is important to realize that, each conveyer belt 1 or 2 has a surface covered with a sheet of component elements of so-called velvet type fasteners. For example, the conveyer belt 1 has a surface covered with a sheet of male elements $14a$ of the velvet type fastener, while the conveyer belt 2 has an opposite surface covered with a sheet of female elements $14b$ of the velvet type fastener as shown in FIG. 4. Consequently, when the conveyer belts 1 and 2 pass through the urging portion created by the guide rollers $4a$, $4b$, the male elements of the endless conveyer belt 1 engage with the female elements of the endless conveyer belt 2. This engaging condition of the male elements of the endless conveyer belt 1 with the female element of the endless conveyer belt 2 is maintained in the vertical passage 5 formed between the two pairs of guide rollers 3a, 3b and 4a, 4b.

Consequently, the belt conveyer shown in FIG. 1 works as follows. That is, when a substance 15 to be conveyed is supplied into the above-mentioned vertical passage 5, the guide rollers 4a, 4b are displaced away from each other so as to permit the conveyed substance 15 to go into the vertical passage 5. However, the upstream portion of the conveyer belts 1 and 2 is maintained in the condition of the male elements 14a being engaged with the female elements 14b as shown in the right hand portion of FIG. 4. When the substance 15 passes through the entrance portion of the vertical passage 5 controlled by the guide rollers 4a, 4b, the male elements 14a of the belt 1 again engage with the female elements 14b of the belt 2. Consequently, the substance 15 is positively enveloped by a space formed by disengaged male elements 14a of the belt 1 and female elements 14b of the belt 2. This condition is maintained during the entire time the substance 15 is carried through the vertical passage 5. Consequently, the relative position of successive substances supplied into the vertical passage 5 can be positively maintained. When the substance 15 comes to a terminal of the vertical passage 5, as the guide rollers 3a, 3b are supported as mentioned above, the guide rollers 3a, 3b permit delivery of the substance 15 from the terminal of the vertical passage 5 by moving away from each other. At this terminal, the male elements 14a of the belt 1 are positively disengaged from the female elements 14b of the belt 2 due to their turning motions about the respective guide rollers 3a and 3b.

If the vertical passage 5 is too long, or the conveyed substance 15 is too thick or heavy there is a certain possibility of premature disengaging of the male elements 14a of the belt 1 from the female elements 14b of the belt 2 in the vertical passage 5. To prevent this disengagement in the vertical passage 5, the control guide rollers 12a, 12b and 13a, 13b are applied. However, if the conveyed substance 15 is very thin or very light, use of these control guide rollers 12a, 12b, and 13a, 13b can be omitted.

In the above-mentioned embodiment, as best shown in FIG. 4, the sheet of male elements of the velvet type fastener comprises sheet material and a plurality of mushroom type elements projecting from and distributed over substantially the entire surface of the sheet material, while the sheet of female elements of the velvet type fastener comprises a sheet material similarly provided with a plurality of loops formed thereupon. However, a conventional velvet type fastener can be utilized with the same result as the above-mentioned velvet type fastener.

In the above-mentioned embodiment, each conveyer belt 1 or 2 comprises a base endless belt 1a or 2a respectively. These base endless belts 1a and 2a are provided with respective inside surface with lateral grooves shown in FIG. 4. The guide rollers utilized for this belt conveyer are provided with a plurality of guide grooves laterally formed on the surface parallel to the central axis thereof. For example, these grooves are shown in FIG. 2 and represented by 3a', 3b' respectively. According to the above-mentioned configuration of the base endless belts 1a, 1b and the guide rollers, the conveyer belts 1 and 2 can be driven in preferable condition without slip. However, in the case of conveying light substances, a base endless belt 1a, 1b without grooves can be satisfactorily utilized.

In the above-mentioned embodiment, the pairs of guide rollers 3a, 3b, and 4a, 4b, the pairs of control guide rollers 12a, 12b and 13a, 13b are displaceably supported by the respective bearing supports. However, if the conveyed substance 15 is thin, it is not necessary to support these rollers as mentioned above but, rather it is sufficient to support one of each pair of rollers in displaceable condition so as to move away from the other roller. To satisfy this requirement, a bearing support for this purpose is shown in FIG. 5.

In FIG. 5, a bearing support 16 is provided with a horizontal slot 7 which permits sliding motion of the bearing 6a supporting the shaft 5a of the guide roller 3a therein, and a piston cylinder 20. A piston rod 22 is connected to the bearing 6a and its other terminal is connected to a piston 21 of the piston cylinder 20. This piston 21 is always urged by the piston rod 22 towards the bearing 6a by a liquid pressure imparted into a room 23 by way of a conduit 24. The bearing 6b supporting the shaft 5b of the guide roller 3b is stationarily held at a terminal of the horizontal slot 17. A helical spring 19 is inserted into a space formed in the slot 17 at a position between the bearings 6a and 6b in compressed condition. The working pressure to the piston rod 22 is much larger than the resilient force of the helical spring 19. Consequently, the endless belts 1 and 2 contact each other under a pertinent pressure. However, when a conveyed substance 15 is subjected to passing through the terminal of the vertical passage 5, the bearing 6a is subjected to displace away from the bearing 6b against the working pressure to the piston rod 22.

The above-mentioned supporting mechanism is also applied to the guide rollers 4a, 4b, control guide rollers 12a, 12b and 13a, 13b.

If the above-mentioned bearing support is utilized, the driving rollers 10a, 10b can be replaced by tension rollers like the tension rollers 11a, 11b, while the guide rollers 3a, 4b are replaced by the guide rollers supported by a stationary bearing like the bearing 6b in FIG. 5. In this condition, the guide rollers 3b, 4a are required to be driving rollers like the rollers 10a, 10b respectively.

FIG. 6 shows another type of guide roller which permits passing the conveyed substance through the terminals of the conveyer passage. For the sake of simplification this modification is illustrated as being applied only to the pair of guide rollers 3a and 3b. In FIG. 6, the guide roller 3a is provided with a pair of flanges 25 formed at both ends thereof, a plurality of intermediate circular grooves 26 formed on the cylindrical surface between the flanges 25, and a plurality of rubber tubes 27 mounted on the respective grooves 26. These rubber tubes 27 are pressurized by compressed air. The endless belt 1 is guided by this roller, while the endless belt 2 is guided by the roller 3b rotatably supported by a stationary bearing support, and the roller shaft of this guide roller 3a is also rotatably supported by the stationary bearing support. Consequently, when a certain conveyed substance is to pass the terminal of the conveying passage 5, the rubber tubes 27 are deformed so as to permit the passing of the substance. As there is a certain limit to the above-mentioned deformation of the rubber tubes 27, this mechanism is restricted in application to conveying very thin conveyed substances.

In the embodiment shown in FIG. 7, the guide rollers 3a, 3b illustrated by the embodiment shown in FIG. 5 are utilized. In this embodiment, the guide rollers 3b, 4a are driving rollers, while the guide roller 3a is the displaceable roller. As the guide roller 4b is positioned at an elevated position above the guide roller 4a, the guide roller 4b may be a roller rotatably supported by a stationary bearing, because at the contacting portion 28 of the endless belt 2 with the endless belt 1, the endless belt 1 can be deformed so as to permit the passing of the conveyed substance through this contacting portion 28.

In the modified embodiment of the belt conveyer shown in FIG. 8, a horizontal conveying passage 29 and a vertical conveying passage 30 are formed in combination. In this embodiment, a pair of guide rollers 3a, 3b identical to the rollers 3a, 3b shown in FIG. 1, guide rollers 4a, 4b rotatably supported by respective stationary bearings (not shown), driving guide rollers 4c, 4d and a tension roller 11b are utilized. According to the belt conveyer shown in FIG. 8, conveyed substances are firstly carried along the horizontal passage 29 and then carried upwards along the vertical passage 30.

By replacing the above-mentioned horizontal passage with an inclined passage, or by selecting a combination of the above-mentioned several different passages, the conveyed substances can be carried to any desired position without changing the relative positions of these substances supplied into the entrance of the combined passage.

What is claimed is:

1. A belt conveyer for conveying articles along a conveying path having an upright passage, comprising: first and second belts, each having two surfaces; means for guiding and driving said belts along the conveying path, and for guiding them opposite one another in the upright passage; means for admitting articles to the conveying path in variable, relative positions for conveying the articles along the path; interlockable fastener elements substantially covering an entire one of the surfaces of each belt; and means for interlocking said fastener elements of the two belts, about each article admitted to the path, to fix the relative positions of the articles throughout the conveying path, including the upright passage.

2. A conveyer according to claim 1 including means, located at points disposed along said upright passage, for keeping said fastener elements interengaged about each article admitted to said path.

3. A belt conveyer according to claim 1, wherein said first and second belts comprise endless belts.

4. A belt conveyer according to claim 1, wherein said interlockable elements comprise velvet type fasteners.

5. A belt conveyer according to claim 4, wherein said means for guiding and driving each of said first and second belts comprises at least two guide rollers and means for driving at least one of said rollers.

6. A belt conveyer according to claim 5, wherein said guide rollers have grooves on the periphery thereof to prevent slippage of the belts.

7. A belt conveyer according to claim 5, wherein said means for guiding and driving said two belts further comprises at least one tension roller disposed between said guide rollers.

8. A belt conveyer according to claim 1, wherein said conveyer path is vertical.

9. A belt conveyer according to claim 1 wherein said conveyer path comprises a horizontal segment and a vertical segment.

10. A belt conveyer according to claim 1, wherein said means for interlocking comprises means for enabling the conveyed article disposed between the two belts to pass thereby.

11. A belt conveyer according to claim 10, wherein said means for interlocking comprises at least one set of two guide rollers having parallel axes and each roller disposed in contact with the outer surface of one of said belts and means biasing said guide rollers towards one another.

12. A belt conveyer according to claim 11, wherein the biasing means comprises means mounting the two guide roller for movement in the plane of their axes and spring means for urging the two rollers towards one another and wherein said means for enabling comprises means mounting said two guide rollers for movement away from each other in response to the conveyed article passing therebetween.

13. A belt conveyer according to claim 10, wherein the biasing means comprises means fixedly mounting the axis of one of the guide rollers and mounting the other guide roller for movement in the plane of the guide roller axes and spring means for urging said other roller towards said one roller and wherein said means for enabling comprises means mounting said other roller for movement away from said one roller in response to the conveyed article passing therebetween.

14. A belt conveyer according to claim 1, wherein said means for interlocking comprises one roller disposed in contact with the other surface of each of said belts.

15. A belt conveyer according to claim 10, wherein said means for interlocking comprises at least one set of two guide rollers each having a circumferential working surface and both having parallel axes and each roller disposed in contact with the other surface of one of said belts and wherein said means for enabling comprises said working surface comprising resilient deformable material deforming in response to contact with the conveyed article.

* * * * *